Figures 1, 2:
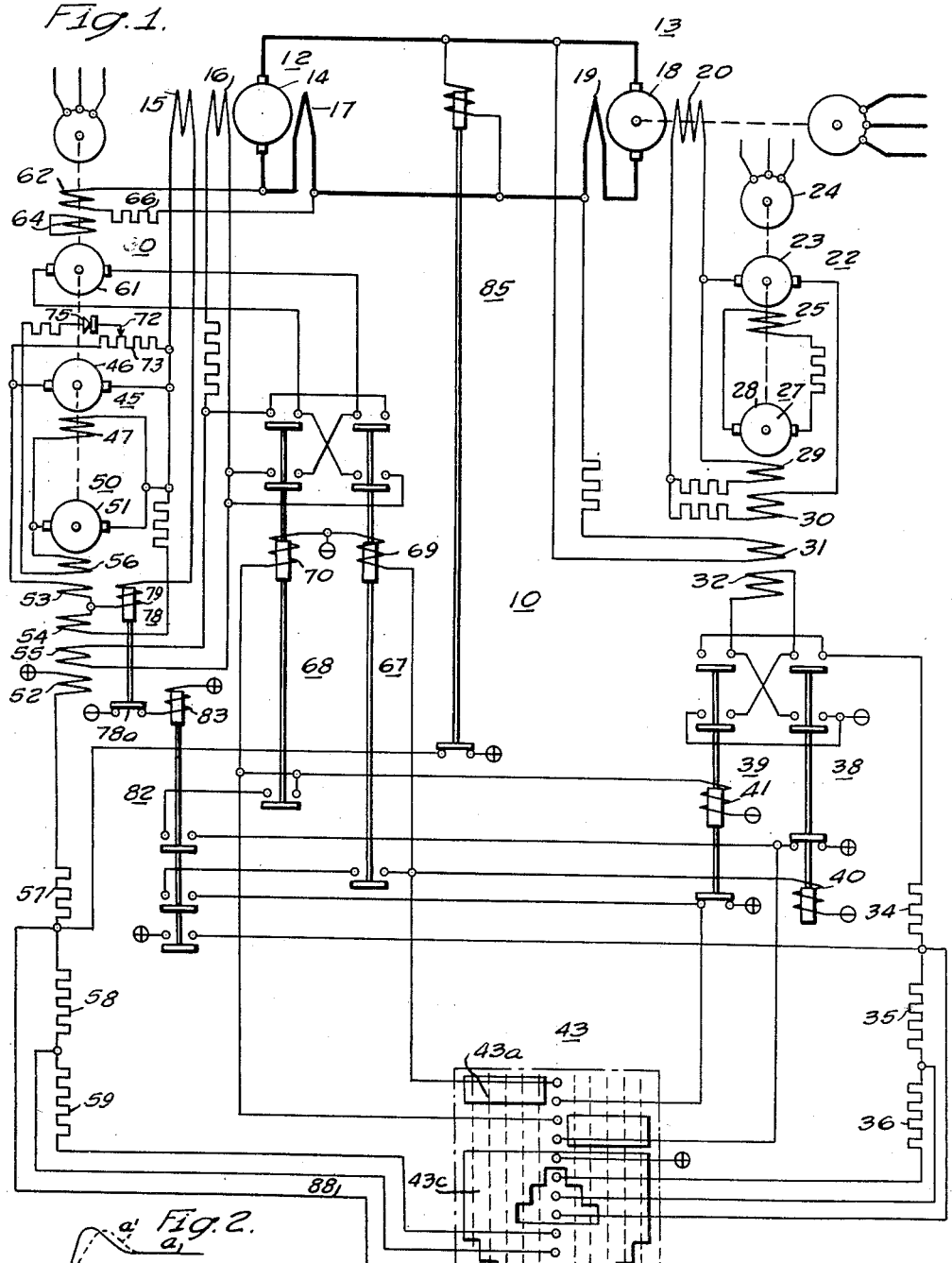

Aug. 15, 1950  E. F. ALLBERT ET AL  2,519,212
REGULATING GENERATOR CONTROL SYSTEM
Filed Feb. 21, 1947

Time

INVENTORS
Eugene F. Allbert and
Martin H. Fisher.
BY
G. W. Crawford
ATTORNEY

UNITED STATES PATENT OFFICE 2,519,212

REGULATING GENERATOR CONTROL SYSTEM

Eugene F. Allbert, Turtle Creek, and Martin H. Fisher, Pittsburgh, Pa., assignors to Westinghouse Electric Corporation, East Pittsburgh, Pa., a corporation of Pennsylvania Application February 21, 1947, Serial No. 729,939

8 Claims. (Cl. 318—434)

Our invention relates, generally, to control systems, and it has reference in particular to regulating generator control systems for motors operating in variable voltage systems and the like.

Generally stated, it is an object of our invention to provide an improved motor control system which is simple and inexpensive to manufacture, and is reliable and efficient in operation.

More specifically, it is an object of our invention to provide for limiting the armature current of a dynamoelectric machine when the field strength of the machine is rapidly increased.

It is also an object of our invention to provide, in a motor control system, for utilizing a difference in times of response to changes of electrical conditions at different portions of the system for retarding the rate of change of an operating condition of the motor.

Another object of our invention is to provide, in a regulating generator control system, for utilizing the difference in the times of response of a regulating generator and an exciter controlled thereby, for retarding the rate of change of output of the regulating generator.

Yet another object of our invention is to provide, in a variable voltage motor control system, for limiting the initial rate of increase of motor field strength so as to reduce the peak values of motor armature current.

It is an important object of our invention to provide for modifying the rate of change of motor field strength by controlling the output of a regulating generator used to control a motor in accordance with a differential between the output voltage of the regulating generator and the voltage applied to the motor field winding.

Other objects will, in part, be obvious and will, in part, be explained hereinafter.

In practicing our invention in one of its forms, a regulating generator is used to energize the field winding of an exciter supplying electrical energy to the field winding of a motor in a variable voltage control system. The pattern field winding of the regulating generator is energized under the control of a master switch, and the differential field winding is energized in accordance with the current applied to the motor field winding. Hunting is reduced by means of an anti-hunt field winding energized in accordance with the value of the motor field current. Peak values of motor armature current which would otherwise be produced by suddenly strengthening the motor field, are reduced by means of a modifying field winding which is energized in accordance with the differential between the output voltages of the regulating generator and of the exciter supplying electrical energy to the motor field winding. The modifying field winding is so connected that it opposes the magnetomotive force of the pattern field winding and thereby retards the rate of increase of the output voltage of the regulating generator.

For a more complete understanding of the nature and scope of our invention, reference may be made to the following detailed description which may be read in connection with the accompanying drawing, in which:

Figure 1 is a diagrammatic view of a motor control system embodying the invention in one of its forms; and, Fig. 2 shows a plurality of operating characteristic curves, illustrating the improvement obtained in the performance of the system shown in Fig. 1 over similar systems not embodying the invention.

Referring to Fig. 1 of the drawing, the reference numeral 10 may denote generally a control system for a main reversing motor 12 which may be connected in a variable voltage system energized from a main generator 13. The control system may be generally similar to that shown and described in detail in our copending application Serial No. 729,940, except as modified in accordance with the present invention.

The main motor 12 may comprise an armature 14, a main field winding 15, a current limit field winding 16 and a compensating field winding 17. The compensating field winding 17 may be connected in series circuit relation with the armature 14 for energization from the main generator 13 which may comprise an armature 18 with a compensating field winding 19 and a main field winding 20.

The output voltage of the main generator 13 may be controlled by varying the energization of the main field winding 20, which may be connected to a source of electrical energy, such as the exciter 22. The exciter 22 may comprise an armature 23 connected in driving relation with a motor 24 and a field winding 25. The field winding 25 may be energized from a regulating generator 27 having an armature 28, an anti-hunt field winding 29, a self-energizing field winding 30, a differential field winding 31 and a pattern field winding 32.

The pattern field winding 32 may be connected to a suitable source of electrical energy for variable energization through a plurality of control resistors 34, 35 and 36 by means of "forward"

and "reverse" relays 38 and 39 having operating windings 40 and 41 disposed to be energized through a master switch 43, which may be of the drum type.

The differential field winding 31 may be connected across the armature 18 of the main generator so as to be energized in accordance with the output voltage of the generator and in such a direction as to oppose the magnetomotive force of the pattern field winding 32.

The self-energizing field winding 30 may be connected in series circuit relation with the main field winding 29 and the armature 23 of the exciter 22 so as to be energized in accordance with the value of the field current of the main generator. The anti-hunt field winding 29 may be connected in shunt circuit relation with the field main winding 20 and in such a direction as to oppose the magnetomotive force of the self-energizing field winding 30.

The main field winding 15 of the motor 12 may be energized from an exciter 45 comprising an armature 46 and a field winding 47. The exciter may have sufficient output to "force" the energization of the winding 15 for effecting rapid changes in the operation of the motor. The output voltage of the exciter 45 may be controlled by means of a motor regulating generator 50 comprising an armature 51, a pattern field winding 52, a differential field winding 53, an anti-hunt field winding 54 and a modifying field winding 56.

The pattern field winding 52 may be variably energized from a suitable source of electrical energy through a plurality of control resistors 57, 58 and 59 by means of the master switch 43, so as to provide for variably controlling the output of the regulating generator 50. The differential field winding 53 may be connected in series circuit relation with the main field winding 15 and the armature 46 of the exciter 45 so as to be energized in accordance with the value of the motor field current and in such a direction as to oppose the magnetomotive force of the pattern field winding 52. The anti-hunt field winding 54 may be connected in shunt circuit relation with the main field winding 15 so as to be energized in accordance with the current applied to the main field winding.

The peak values of armature current of the main motor 12 may be limited by using a current limit generator 60 comprising an armature 61, a current limit field winding 62 and a short-circuited field winding 64. The current limit generator 60 may be of the type described generally in Patent No. 2,383,971, which issued to J. G. Ivy on September 4, 1945, and which has an output characteristic such that the output voltage of the generator remains at a substantially zero value until the energization of the field winding 62 reaches a predetermined value, whereupon the output voltage rises rapidly.

The field winding 62 of the generator 60 may be energized in accordance with the armature current of the main motor 12 being, for example, connected across the compensating field winding 17 in circuit relation with a control resistor 66 for adjusting the value of armature current to which the main motor 12 is to be limited. The armature 61 may be connected to the current limit field winding 16 of the main motor and the current limit field winding 55 of the motor regulating generator 50 by means of "forward" and "reverse" relays 67 and 68 having operating windings 69 and 70 which may be energized through the master switch 43.

In order to provide for more effectively limiting the peak values of the armature current of the main motor 12 during regeneration when the energization of its main field winding 15 may be strengthened due to operation of the master switch 43 to shunt the control resistors 58 and 59, the modifying field winding 56 may be arranged for energization under this condition, and in such direction as to oppose the magnetomotive force of the pattern field winding 52. For example, this modifying field winding 56 may be connected between the positive terminal of the armature 51 of the regulating generator and the adjustable tap 72 of a voltage divider 73 which may be connected across the armature 46 of the motor exciter 45. In this manner the modifying field winding 56 will be energized in accordance with the differential between the output voltage of the motor regulating generator 50 and any desired portion of the output voltage of the motor exciter 45, and only when such a differential exists. The tap 72 may be adjusted to vary the effectiveness of the winding 56. Unidirectional current means, such as the rectifier device 75, may be connected in series circuit relation with the modifying field winding 56 so as to prevent energization of this winding when the master switch 43 is operated in the direction to reduce the energization of the main field winding 15.

For the purpose of providing a relatively high value of generator voltage whenever the field of motor 12 is suddenly strengthened, means such as the current responsive relay 78, may be provided having winding 79 connected in series circuit relation with the main field winding 15 of the motor 12. An auxiliary control relay 82 may be provided having an operating winding 83 which is energized from a suitable source of electrical energy through normally closed contact member 78a of the current responsive relay 78. The auxiliary relay 82 may be arranged to shunt the control resistors 35 and 36 to insure a relatively high output voltage of the main generator 13 whenever the master switch 43 is operated to reverse the main motor 12 so rapidly that the energization of its main field winding 15 does not have sufficient time to increase before the master switch 43 operates to reduce the energization of the field winding 20 of the main generator as it moves toward the reverse operating position. A voltage relay 85 which is responsive to the voltage of the main generator 13 may be provided for shunting the control resistors 58 and 59 to insure a relatively strong motor field whenever the voltage of the generator 13 is below a predetermined operating value.

In operation, the "forward" relays 38 and 67 will be energized through segment 43a of the master switch 43 when it is moved in the "forward" direction. The output voltage of the motor exciter 45 which is determined by the energization of the pattern field winding 52 of the motor regulating generator, will initially be at a maximum value since the control resistors 58 and 59 are initially shunted through conductor 88 and segment 43c of the master switch. The output voltage of the main generator 13 is initially at a minimum value since the pattern field winding 32 of its regulating generator 27 is initially connected to the source of electrical energy through the control resistors 34, 35 and 36 in series circuit relation, through segment 43c of the master switch.

As the master switch 43 is moved through successive positions in the "forward" direction, the control resistors 36 and 35 are shunted successively to increase the energization of the pattern field winding 52 and thereby increase the output voltage of the main generator 13 so as to speed up the main motor 12. Further movement of the master switch 43 in the "forward" direction disconnects the conductor 88 from segment 43c and inserts control resistors 58 and 59 in series circuit relation with the pattern field winding 52 of the motor regulating generator, in successive positions of the master switch, so as to further increase the speed of the main motor 12.

Should the energization of the pattern field winding 52 be increased rapidly because of rapid movement of the master switch 43 in the reverse direction to successively shunt control resistors 59 and 58, the armature current of the main motor 12 would tend to reverse and reach a relatively high peak value in the reverse direction due to regeneration. However, since the output voltage of the motor regulating generator 50 increases before the output voltage of the motor exciter 45 which it controls, an excitation current will therefore be forced through the modifying field winding 56 due to the differential between the output voltages of the regulating generator 50 and the exciter 45. Since the magnetomotive force of the modifying field winding 56 opposes that of the pattern field winding 52, the rate of increase of the output voltage of the regulating generator 50, as determined by the energization of the pattern field winding 52, will be reduced so long as a differential exists between the output voltages of the regulating generator and the exciter at any given instant of time. This causes the voltage applied to the main field winding 15 to be reduced so that the rate of increase of energization of the motor field is retarded.

This result may be clearly observed by referring to the curves of Fig. 2 wherein the solid curves $a$, $b$, $c$ and $d$ represent, respectively, the voltage applied to the motor field winding 15, the current of the exciter field winding 47, the output voltage of the motor regulating generator 50, and the current of the motor field winding 15. These curves represent the operating values of these quantities when the master switch 43 is operated to increase the energization of the main field winding 15 of the main motor 12 under conditions where the motor regulating generator 50 is not provided with a modifying field winding 56. The dotted curves $a'$, $b'$, $c'$ and $d'$ represent corresponding values of the quantities under similar operating conditions, wherein the motor regulating generator 50 is provided with a modifying field winding 56 in accordance with the present invention.

It will be observed that the relatively high peak voltage of the motor regulating generator 50 represented by the curve $c$, is greatly reduced as shown by the dotted curve $c'$. Since the modifying field winding 56 of this machine is energized in accordance with the differential between the regulating generator 50 and exciter 45, output voltages, which exist because of the must faster response of the regulating generator whose output voltage obviously must increase ahead of that of the exciter 45 which it controls, this reduction in the output voltage of the regulating generator is reflected in the voltage applied to the main field winding 15 of the motor 12 as represented by the curve $a'$.

While this voltage reaches approximately the same peak value attained by the curve $a$, it will be seen that the peak value for the curve $a'$ occurs at a much later interval of time due to the retarding effect of the modifying field winding. This shifting of the voltage curve results in a corresponding retardation in the rate of increase of the field current in the main field winding 15, as shown by the displacement of the curve $d'$ to the right of the curve $d$. Accordingly, the rate of increase of energization of the main field winding 15 is reduced, and the peak values of the motor armature current are also reduced.

Even though the stored energy in the main motor 12 is proportional to the square of the speed, the reduced initial rate of field strengthening due to the action of the modifying field winding 56 allows the energy of the motor to be uniformly returned into the main generator 13 and its driving motor without a steep initial peak during the regenerative period.

As soon as the voltage of the motor exciter 45 is equal to that of the regulating generator 50, the modifying field winding 56 becomes deenergized, so that it does not affect the normal steady state operating characteristics of the regulating generator. Because of the functioning of the rectifier device 75, the field strength of the main motor 12 may be weakened without affecting energization of the modifying field winding 56 to retard the change in energization of the main field winding 15.

From the above description and the accompanying drawing, it will be apparent that we have provided, in a simple and effective manner, for controlling the operating characteristics of motors in any kind of a control system, variable voltage or otherwise. By utilizing unidirectional current means, the modifying field winding may be utilized for limiting the peak values of armature current for changes of the motor field strength in either direction. By omitting the rectifier device, the modifying field winding 56 may be utilized for retarding the rate of change of field strength in either direction, if desired.

Since certain changes may be made in the above-described construction and different embodiments of the invention may be made without departing from the spirit and scope thereof, it is intended that all the matter contained in the above description shall be considered as illustrative and not in a limiting sense.

We claim as our invention:

1. A control system for a motor having an armature and a field winding comprising, an exciter connected to energize said field winding, a regulating generator connected to control the output voltage of the exciter, said regulating generator having a plurality of field windings including a modifying field winding, and circuit means connecting the modifying field winding in circuit relation with the regulating generator and the exciter for energization in accordance with a transient differential between the voltages of the regulating generator and the exciter.

2. In a control system, a motor having an armature energized from a source of electrical energy and having a field winding, control means including a regulating generator connected to effect energization of said field winding, said regulating generator being provided with an armature and a plurality of field windings including opposed pattern and control field windings and a modifying field winding, and circuit means connecting the modifying field winding in circuit relation with the armature of the regulating generator and the motor field winding in opposition to the pattern field winding for energization in accordance with the differential between the voltage of the regulating generator and the voltage applied to the motor field winding.

3. A control system for a motor having an armature and a field winding comprising, an exciter having an armature and a field winding, said exciter being connected to energize the motor field winding, a regulating generator having an armature connected to apply a control voltage to the field winding of the exciter, said regulating generator having opposed pattern and control field windings disposed to be connected to regulate the output voltage and having a modifying field winding, and circuit means including a rectifier device connecting the modifying field winding in circuit relation with the armatures of the exciter and regulating generator to oppose the pattern field winding in accordance with the differential between the output voltage of the regulating generator and the output voltage of the exciter.

4. In a control system; a motor having an armature connected to a source of electrical energy and a field winding; an exciter connected to energize said field winding; a regulating generator connected to supply field excitation to and control the output voltage of the exciter, said regulating generator having an armature and a pattern field winding connected for variable energizaion to a source of electrical energy, an opposed control field winding connected to be energized in accordance with the motor field current, and a modifying field winding; a potentiometer device connected across the exciter; and circuit means including the potentiometer device and a rectifier device connecting the modifying field winding to the armature of the regulating generator for energization in accordance with a transient differential between the regulating generator and exciter voltages in opposition to the pattern field winding to reduce the effect of the pattern field winding under transient conditions.

5. In a control system for a motor having a field winding, an exciter connected for energizing the field winding of the motor, a regulating generator connected to control the output voltage of the exciter, said regulating generator having an armature together with opposed pattern and control field windings and a modifying field winding, a potentiometer connected in shunt circuit relation with the field winding of the motor, and circuit means including a rectifier device connecting the modifying field winding in circuit relation with the potentiometer device and the armature of the regulating generator in opposed senses.

6. A control system for a motor having an armature energized from a variable voltage source and a field winding; an exciter connected to energize the field winding, said exciter having a field winding; a regulating generator connected to supply electrical energy to the exciter field winding and control the output of the exciter, said regulating generator having an armature and a plurality of windings including a pattern field winding, a control field winding and a modifying field winding; circuit means connecting the pattern field winding to a source of control voltage; additional circuit means connecting the control field winding in circuit relation with the motor armature in opposed relation to the pattern field winding for energization in accordance with the motor field current; and circuit means including a rectifier device and a potentiometer energized in accordance with the output voltage of the exciter connecting the modifying field winding in opposed relation to the pattern field winding for energization in accordance with a transient differential between a first voltage derived from the potentiometer device and a second voltage derived from the regulating generator and having a delayed time relation to said first voltage.

7. A control system comprising, generating means disposed to supply electrical energy to a load circuit, a regulating generator connected to supply excitation to the generating means, said generator having an armature and a plurality of field windings, a circuit means connected to supply electrical energy to one of said windings, and additional circuit means connecting another of said windings in opposed relation to the generating means and the armature of the regulating generator for energization in accordance with a transient difference between the voltage of the generating means and the output voltage of the regulating generator.

8. A control system for a dynamoelectric machine having armature and field windings comprising, a regulating generator controlling the energization of one of said windings, said generator having an armature and a plurality of field windings, and circuit means connecting one of said field windings to the regulating generator armature and the armature of the dynamoelectric machine in opposed relation for energization in accordance with a transient differential between the voltage of said generator and the armature voltage of said machine.

EUGENE F. ALLBERT.
MARTIN H. FISHER.

REFERENCES CITED

The following references are of record in the file of this patent:

UNITED STATES PATENTS

| Number | Name | Date |
|---|---|---|
| 2,347,037 | Edwards et al. | Apr. 18, 1944 |
| 2,393,618 | Edwards et al. | Jan. 29, 1946 |